United States Patent Office 3,149,102
Patented Sept. 15, 1964

3,149,102
PROCESS FOR THE PREPARATION OF IMINO-
PREGNADIENES, NOVEL STEROID INTERME-
DIATES AND NOVEL 3-KETO - $\Delta^4$ - 18,20 - OXY-
GENATED STEROID DERIVATIVES
Vlasios Georgian, Evanston, Ill., and James F. Kerwin,
Broomall, and Manfred E. Wolff, Elkins Park, Pa., as-
signors to Smith Kline & French Laboratories, Phila-
delphia, Pa., a corporation of Pennsylvania
No Drawing. Filed Nov. 27, 1959, Ser. No. 855,517
11 Claims. (Cl. 260—239.5)

This invention relates to a process for the preparation
of 3-keto-$\Delta^{4;20,N}$-18,20-iminopregnadienes and to novel
steroid intermediates useful therein. Further, this inven-
tion relates to novel 3-keto-$\Delta^4$-18,20-oxygenated steroid
derivatives. The pregnadienes of this invention are useful
as intermediates in the preparation of 3-keto-$\Delta^4$-18,20-
oxgenated steroids which have valuable therapeutic ac-
tivity, particularly as diuretics.

More specifically, the 3-keto-$\Delta^4$-18,20-oxygenated ste-
roids of this invention are useful as diuretic, anti-inflam-
matory and anabolic agents, and as blockers of aldoster-
one (anti-aldosterones). Aldosterone is the principal
hormone responsible for sodium retention. Several clini-
cal disorders such as cirrhosis, nephrosis and congestive
heart failure lead to sodium retention and edema, and are
associated with increased secretion of aldosterone. The
18,20-oxygenated steroids of this invention in blocking the
effects of aldosterone increase sodium excretion leading
to a diuretic action and thereby are useful therapeutic
agents. The 18,20-oxygenated steroids in addition to such
diuretic activity are useful in the synthesis of the more
highly substituted aldosterone-like compounds. In addi-
tion, the close structural relationship of the 18,20-oxy-
genated steroids of this invention to the known adreno-
cortical and sex hormones ascribe to the former com-
pounds some of the parents' respective pharmacological
effects such as anti-inflammatory activity when the basic
structures resemble the corticoid agents and anabolic
properties when the basic structures resemble the proges-
terones. The 18,20-oxygenated steroids of this invention
are particularly valuable since they possess the 3-keto-$\Delta^4$-
moiety which is a structural requirement for many of the
physiologically active steroids.

The process of this invention for the preparation of
3-keto-$\Delta^{4;20,N}$-18,20-iminopregnadienes is schematically
represented as follows:

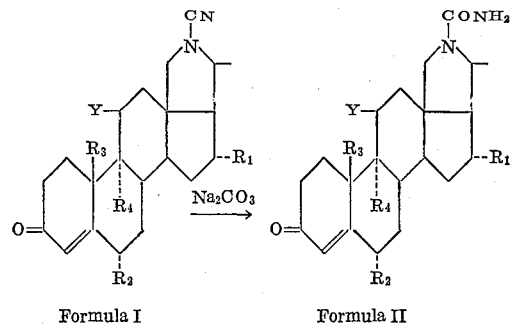

Formula I      Formula II

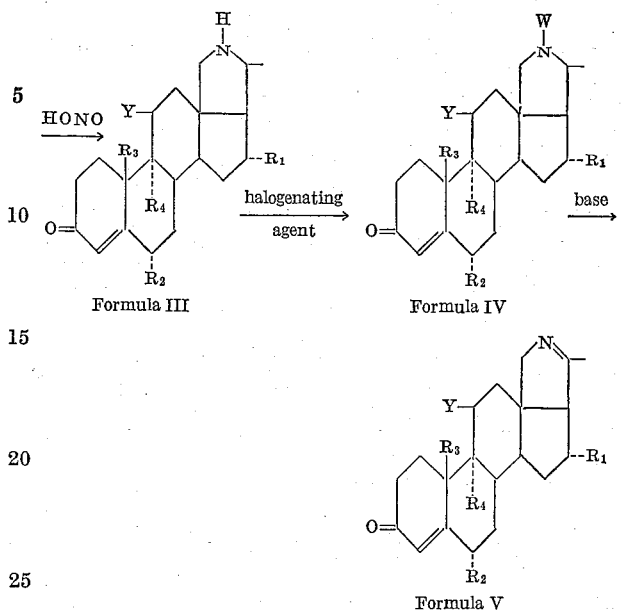

Formula III      Formula IV

Formula V when:
Y represents hydrogen or keto, preferably keto;
Z represents lower alkyl, preferably methyl;
$R_1$ represents hydrogen or methyl, preferably hydrogen;
$R_2$ represents hydrogen, methyl or fluoro, preferably
hydrogen;
$R_3$ represents hydrogen or methyl, preferably methyl;
$R_4$ represents hydrogen or fluoro, preferably hydrogen;
W represents halogen of atomic weight less than 80
such as chlorine or bromine, preferably chlorine.

It is desired to point out that the term "lower alkyl"
is used herein to denote an aliphatic hydrocarbon group
having a maximum of six carbon atoms. Further, the
term "conanine" where used herein generically for either
the saturated or unsaturated derivatives is intended to in-
clude the 20α or 20β configurations and the N-substituted
derivatives.

The starting materials for the process of this invention,
namely the N-cyanonorconanine derivatives of Formula I
above, are prepared from saturated N-cyanonorconanines
represented as follows:

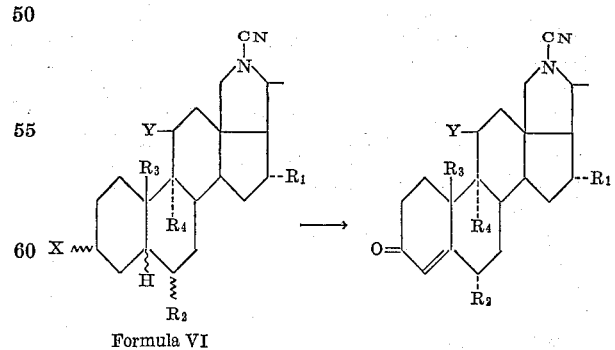

Formula VI when:

ξ is either α or β;

X represents hydroxy, acyloxy or keto, the acyloxy moiety having a maximum of six carbon atoms such as alkanoyl; and Y, Z, $R_1$, $R_2$, $R_3$ and $R_4$ are as defined for Formula I.

The saturated N-cyanonorconanines of Formula VI are converted to the 3-keto-$\Delta^4$-derivatives by standard procedures for introducing this moiety into steroid molecules. When X is acyloxy in Formula VI, the N-cyanonorconanine is first hydrolyzed by refluxing with an alkali metal carbonate such as potassium or preferably sodium carbonate in a lower alkanol solution such as methanol for a short period of time, normally about two hours. The 3-hydroxy saturated N-cyanonorconanine is oxidized to 3-keto with for example chromic oxide and acetone, or with aluminum isopropoxide and cyclohexanone. In the allo series, the 3-keto-5α-saturated N-cyanonorconanine is treated with hydrogen bromide in acetic acid and then bromine in acetic acid to give the corresponding 2,4-dibromide which is refluxed for several hours with sodium iodide in for example one hour with oxalic acid dihydrate. The reaction mixture is taken through a workup procedure including treatment with zinc dust and acetic acid, Girard's Reagent "T" and formaldehyde to give upon acidification to pH 1 the 3-keto-$\Delta^4$-N-cyanonorconanine. In the normal series, the 3-keto-5β-saturated N-cyanonorconanine is treated with bromine in a reaction solvent such as methylene chloride to give the 4-bromo derivative which is heated under nitrogen on the steam bath with lithium chloride in a solvent such as dimethylformamide for several hours. Workup of the reaction mixture yields the 3-keto-$\Delta^4$-N-cyanonorconanine. Alternatively the 4-bromo-5β-derivative is converted to the 3-semicarbazide which is decomposed with pyruvic acid to give the 3-keto-$\Delta^4$-N-cyanonorconanine.

When $R_2$ is a β-methyl or β-fluoro substituent in Formula VI, the resulting 3-keto-$\Delta^4$-N-cyanonorconanine is treated with acid or base to obtain the isomeric α-substituted derivative. For example, the N-cyanonorconanine is treated with 1% concentrated hydrochloric acid in methanol or ethanol for from 30 minutes to one hour, or with 5% 0.1 N sodium hydroxide in methanol at room temperature for 12–18 hours to give the 6α-substituent.

Alternatively a 3β,5α-dihydroxy saturated N-cyanonorconanine derivative of Formula VI is oxidized with aluminum isopropoxide by the Oppenauer method in cyclohexanone to give the 3-keto-$\Delta^4$-N-cyanonorconanines.

The saturated N-cyanonorconanines of Formula VI used as starting materials as described above are prepared from the corresponding conanines in accordance with the first step of the process disclosed in our copending application Serial No. 851,507 filed November 9, 1959, now U.S. Patent No. 3,007,922. According to this step of the process, the conanine is treated with cyanogen bromide in an unreactive solvent such as ether or chloroform at room temperature for several days. Evaporation of the solvent give the N-cyanonorconanine.

The conanines are prepared from the corresponding 20-alkylamino steroids in accordance with the process disclosed in our copending application Serial No. 843,334 filed September 30, 1959. The 20-alkylamino steroids are in turn obtained from 20-keto steroids by a reductive amination process as disclosed in our copending application Serial No. 821,348 filed June 19, 1959, now U.S. Patent No. 2,983,736. According to the process of Serial No. 821,348, the 3-hydroxy- or 3-acyloxy-20-keto sterioid is hydrogenated in the presence of a primary lower alkyl amine dissolved in an unreactive organic solvent such as dioxone, ethanol or methanol, and a hydrogenation catalyst such as platinum oxide at about room temperature until one mole of hydrogen is absorbed. Acid treatment of the reaction residue isolates the 20-alkylamine. Oxidation of the 3-hydroxy group gives the 3-keto derivative.

According to the process of Serial No. 843,334 the 20-(N-alkyl-N-haloamino)-steroid (obtained from the 20-alkylamine by treatment with a halogenating agent such as N-chlorosuccinimide or sodium hypochlorite) is irradiated with ultraviolet light in the presence of trifluoroacetic acid at from −20° C. to about 40° C. and the intermediate 18-halo steroid is treated with an alkali metal hydroxide such as potassium hydroxide in a lower alkanol solvent at reflux temperature for from 1 to 3 hours. Extraction of the reaction solution yields the saturated conanine upon evaporation. Acylation with for example acetic anhydride in acetic acid solution gives the 3-acyloxy derivative.

In accordance with the novel process of this invention as shown above, the 3-keto-$\Delta^4$-N-cyanonorconanine derivative of Formula I is hydrolyzed to give the N-carboxamidonorconanine derivatives of Formula II above. Advantageously the N-cyanonorconanine is hydrolyzed by treatment with alkali in the pH range of 9–10, such as with dilute sodium or potassium hydroxide, or preferably with an alkali metal carbonate, such as sodium or potassium carbonate, preferably sodium carbonate, in water. Preferably the N-cyanonorconanine is dissolved in an organic solvent, such as a lower alkanol, for example methanol or ethanol. The reaction mixture is heated at reflux for from 5 to 10 hours, cooled diluted with water and extracted into an unreactive organic solvent such as ether. The extract is washed, dried and evaporated to give the N-carboxamidonorconanine. Alternatively, the N-cyanonorconanine is hydrolyzed with acid such as for example dilute sulfuric acid in acetic acid or dilute hydrochloric acid in acetic acid.

The 3-keto-$\Delta^4$-N-carboxamidonorconanine is treated with nitrous acid to give the N-norconanine derivatives of Formula III above. Advantageously a stirred solution of the N-carboxamidonorconanine in aqueous acetic acid is treated dropwise with an aqueous solution of sodium nitrite at 0° C. The reaction mixture is allowed to stand at ambient or room temperature, or from 25 to 30° C., for from 12 to 36 hours and the solid product is removed by filtration.

The 3-keto-$\Delta^4$-N-norconanine is treated with a halogenating agent to give the N-halonorconanine derivatives of Formula IV above. Advantageously the N-norconanine, dissolved in an unreactive organic solvent for example chloroform, is treated with a halogenating agent such as for example N-chlorosuccinimide, hypochlorous acid, sodium hypobromite or preferably sodium hypochlorite, at ambient or room temperature, or 25° C., for from 15 minutes to three hours, preferably 30 minutes. Preferably the halogenating agent is removed and the treatment repeated. Evaporation of the organic solvent yields the N-halonorconanine.

The 3-keto-$\Delta^4$-halonorconanine is then dehydrohalogenated to give the 3-keto-$\Delta^{4,20,N}$-18,20-iminopregnadienes of Formula V above. Advantageously the N-halonorconanine, dissolved in a polar organic solvent, preferably a lower alkanol such as methanol or ethanol, is treated with a base such as an alkali metal hydroxide, for example sodium or potassium hydroxide, or an alkali metal lower alkoxide, for example sodium or potassium methoxide or ethoxide. The reaction mixture is heated at reflux for from 30 minutes to three hours, preferably one hour. The product is isolated by pouring the reaction mixture into water, extracting with for example chloroform and evaporating the solvent.

It is obvious from the above description that the process of this invention affords an advantageous route for the preparation of the 3-keto-$\Delta^{4,20,N}$-18,20-iminopregnadienes of Formula V from the N-cyanonorconanine derivatives of Formula I. Further, the utility of the novel 3-keto-$\Delta^4$-N-cyanonorconanines, -N-carboxamidonorconanines, -N-norconanines and -N-halonorconanines of Formulae I, II, III and IV as intermediates in the process of this invention is equally apparent.

In the process of this invention, the novel steps whereby a 3-keto-Δ⁴-N-cyanonorconanine is hydrolyzed with preferably alkali metal carbonate to the 3-keto-Δ⁴-N-carboxamidonorconanine followed by treatment with nitrous acid to the 3-keto-Δ⁴-N-norconanine as described more fully above are particularly advantageous.

The novel substituted 3-keto-Δ$^{4:20,N}$-18,20-iminopregnadienes prepared as described above are represented by the following structural formulae:

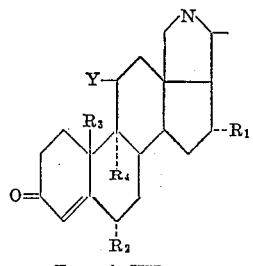 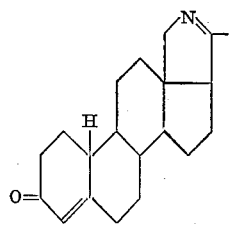

Formula VII          Formula VIII when:

Y represents hydrogen or keto, preferably keto;
R₁ represents hydrogen or methyl, preferably hydrogen;
R₂ represents hydrogen, methyl or fluoro, preferably hydrogen;
R₃ represents hydrogen or methyl, preferably methyl; and
R₄ represents hydrogen or fluoro, preferably hydrogen; at least one of the substituents R₁, R₂ and R₄ is other than hydrogen when Y is hydrogen.

Advantageous novel 3-keto-Δ$^{4:20,N}$-18,20-iminopregnadienes are the 11-keto derivatives represented by the following formula:

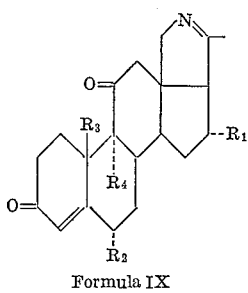

Formula IX when:

R₁ represents hydrogen or methyl, preferably hydrogen;
R₂ represents hydrogen, methyl or fluoro, preferably hydrogen;
R₃ represents hydrogen or methyl, preferably methyl; and
R₄ represents hydrogen or fluoro, preferably hydrogen.

The 3-keto-Δ$^{4:20,N}$-18,20-iminopregnadienes described above are useful as intermediates in the preparation of the corresponding therapeutically valuable 18,20-oxygenated steroids shown as follows:

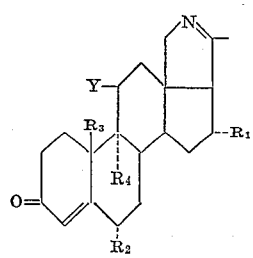  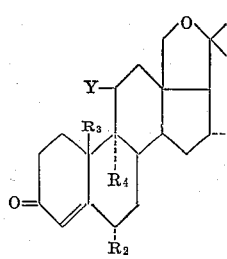

Formula X          Formula XI when:

Y represents hydrogen or keto;
R₁ and R₃ represent hydrogen or methyl;
R₂ represents hydrogen, methyl or fluoro; and
R₄ represents hydrogen or fluoro.

It will be noted that the 18,20-oxygenated steroids of Formula XI above may exist as the 18-hydroxy tautomeric form:

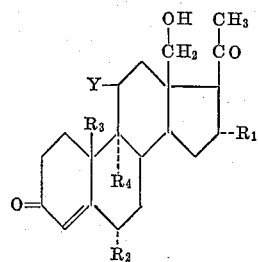

and when Y represents keto may exist as the 11,18-epoxide tautomeric form:

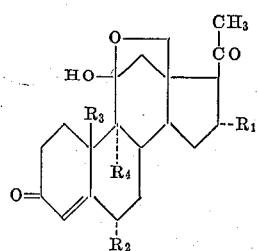

The 3-keto-Δ⁴-18,20-oxygenated steroids of Formula XI are prepared from the intermediate 3-keto-Δ$^{4:20,N}$-18,20-iminopregnadienes of Formula X by treatment with nitrous acid. Advantageously a stirred solution of the iminopregnadiene in aqueous acetic acid is treated dropwise with an aqueous solution of sodium nitrite at 0° C. The reaction mixture is allowed to stand at ambient or room temperature, or from 25 to 30° C., for from 12 to 36 hours and the solid product is removed by filtration.

The novel 3-keto-Δ⁴-18,20-oxygenated steroids prepared from the corresponding intermediate iminopregnadienes as described above which are useful as diuretic, anti-inflammatory, anabolic and anti-aldosterone agents are represented by the following structural formulae:

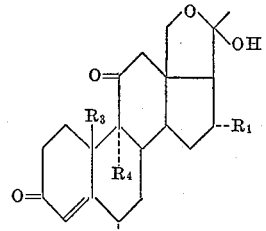 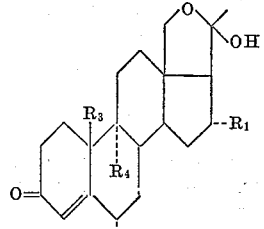

Formula XII          Formula XIII

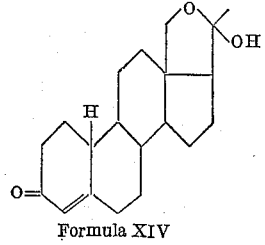

Formula XIV when:

R₁ repersents hydrogen or methyl, preferably hydrogen;
R₂ represents hydrogen, methyl or fluoro, preferably hydrogen;
R₃ represents hydrogen or methyl, preferably methyl; and
R₄ represents hydrogen or fluoro, preferably hydrogen.

In the above Formula XIII at least one of the substituents R₁, R₂ and R₄ is other than hydrogen.

Advantageous novel 3-keto-Δ⁴-18,20-oxygenated steroids are the 11-keto derivatives represented by Formula XII above.

The therapeutically valuable 3-keto-Δ⁴-18,20-oxygenated steroids of Formula XI where $R_3$ is methyl are further useful as intermediates for the preparation of 3-keto-Δ¹,⁴-18,20-oxygenated pregnadienes shown as follows:

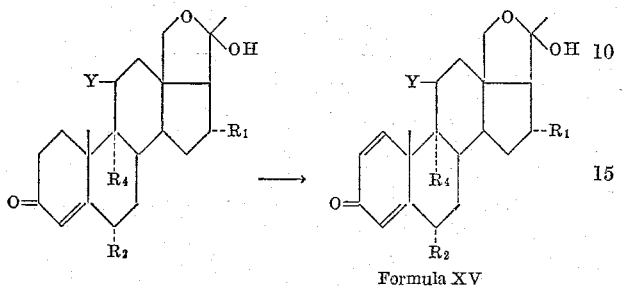

Formula XV when:

Y represents hydrogen or keto, preferably keto;

$R_1$ represents hydrogen or methyl, preferably hydrogen;

$R_2$ represents hydrogen, methyl or fluoro, preferably hydrogen; and $R_4$ represents hydrogen or fluoro, preferably hydrogen.

The pregnadienes of Formula XV are likewise useful as diuretic, anti-inflammatory, anabolic and anti-aldosterone agents and are prepared from the pregnenes as shown above by treatment with selenium dioxide in acetic acid-tert. butanol. This reaction is advantageously effected by long refluxing for example from 24 to 36 hours. Alternatively the pregnadienes are prepared from the 3-keto-5β-saturated N-cyanonorconanines corresponding to Formula VI by brominating the intermediate 4-bromo derivative with one equivalent of bromine and dehydrobrominating the resulting 2,4-dibromo conanine with an excess of collidine. The resulting 3-keto-Δ¹,⁴-N-cyanonorconanines are then reacted as described above through the corresponding N-carboxamido-, N-nor- and N-halo-conanines, and the 3-keto-Δ¹,⁴;²⁰,N-18,20-iminopregnatrienes to give the pregnadienes of Formula XV. Further, the pregnadienes are alternatively prepared from the 3-keto-2,4-dibromo-5α-saturated N-cyanonorconanines described hereinabove by dehydrobromination with collidine and subsequent reaction as described above.

The moieties described hereabove have been limited for purposes of simplification. Thus, for instance the $R_2$ and $R_4$ moieties are described as fluoro but other halogens such as chloro or bromo could be substituted therefor. All isomers not specifically mentioned but covered in the general structural formulae and names are intended to be included in this invention.

The following examples will serve to illustrate the novel process of this invention, the utility of certain 3-keto-Δ⁴-N-cyanonorconanine derivatives therein, the compounds prepared thereby and the utility of 3-keto-Δ⁴;²⁰,N-18,20-iminopregnadienes as intermediates in the preparation of the therapeutically valuable 3-keto-Δ⁴-18,20-oxygenated steroids of Formula XII. As illustrative examples the following are not intended to limit the scope of this invention since obvious alternatives to the methods disclosed herein are likewise within the purview of this invention.

Example 1

The saturated N-cyanonorconanines of Formula VI used to prepare the 3-keto-Δ⁴-N-cyanonorconanines of Formula I are obtained from conanines in accordance with the first step of the process disclosed in copending application Serial No. 851,507 filed November 9, 1959. The saturated conanine derivatives are obtained from 20-alkylamino steroids in accordance with a process disclosed in copending application Serial No. 843,334 filed September 30, 1959. The 20-alkylamino steroids are in turn obtained from 20-keto steroids by a reductive amination process as disclosed in copending application Serial No. 821,348 filed June 19, 1959. These processes are generally outlined in the above description. The following example will serve to give a specific preparation of a saturated N-cyanonorconanine derivative according to the processes of the above identified copending applications.

A solution of 2.8 g. of 3α-hydroxypregnan-20-one in 50 ml. of ethanol containing 10% w./w. of methylamine is shaken under hydrogen in the presence of 200 mg. of platinum oxide until the theoretical amount of hydrogen is absorbed. The turbid mixture is clarified with ethanol, filtered and evaporated in vacuo. The residue is recrystallized to give colorless tetragonal prisms of 3α-hydroxy-20-methylaminopregnane, M.P. 180–205° C.

A solution of 13.3 g. of 3α-hydroxy-20α-methylaminopregnane (obtained by fractional recrystallization) in 200 ml. of chloroform is stirred with 300 ml. of 5% sodium hypochlorite solution for one-half hour, when the hypochlorite is removed and the treatment is repeated. The chloroform layer is separated, washed with water, dried and evaporated to yield a white amorphous solid, 3α-hydroxy-20α-(N-methyl-N-chloroamino)-pregnane, M.P. 119–123° C.

This chloroamine (8.4 g.) is dissolved in 80 ml. of redistilled trifluoroacetic acid and subjected to ultraviolet irradiation under nitrogen atmosphere for 45 minutes. The trifluoroacetic acid is evaporated in vacuo and the residual oil is dissolved in 200 ml. of methanol made strongly basic with 25% methanolic potassium hydroxide solution. The solution is refluxed for one hour, concentrated in vacuo, poured into 300 ml. of water and extracted with chloroform. The residue obtained from evaporation of the washed, dried chloroform solution is 3α-hydroxy-5β-conanine.

To 10.0 g. of 3α-hydroxy-5β-conanine in 100 ml. of glacial acetic acid is added 3.0 g. of chromic oxide in 20 ml. of 95% acetic acid and the mixture is heated at 65° C. for one hour. The solution is diluted with water, made basic with sodium hydroxide solution and extracted with chloroform. The extract is washed with water, dried, filtered and evaporated to give 3-keto-5β-conanine.

To a solution of 5.0 g. of 3-keto-5β-conanine in 500 ml. of ether is added under exclusion of moisture a dry solution of 6.0 g. of cyanogen bromide in 100 ml. of ether and the reaction is maintained at 27° C. for 90 hours. The ether is boiled off and the residue is dissolved in 20 ml. of water and extracted into chloroform. The chloroform extract is washed with water, 10% sodium hydroxide solution and water, dried and evaporated to give 3-keto-5β-N-cyanonorconanine.

Example 2

To 12.1 g. of 3-keto-5β-N-cyanonorconanine dissolved in 300 ml. of methylene chloride is added dropwise with stirring at room temperature a solution of 5.7 g. of bromine in 50 ml. of methylene chloride. When the bromine addition is complete the reaction mixture is washed with dilute sodium bicarbonate solution, water, dried and evaporated to give 4-bromo-3-keto-5β-N-cyanonorconanine. The bromoconanine is dissolved in 100 ml. of dimethylformamide and 9.0 g. of lithium chloride is added. The mixture is heated under nitrogen on the steam bath for two hours. Water is added and the reaction mixture is extracted with methylene chloride. The extract is washed, dried and evaporated to give 3-keto-Δ⁴-N-cyanonorconanine.

A solution of 3.4 g. of 3-keto-Δ⁴-N-cyanonorconanine in 100 ml. of methanol is treated with 4.0 g. of sodium carbonate and 15 ml. of water and the mixture is heated at reflux for six hours. The cooled solution is diluted with water and extracted with ether. The ether extract is washed with water, dried, filtered and evaporated to give 3-keto-Δ⁴-N-carboxamidonorconanine.

A stirred solution of 3.0 g. of 3-keto-Δ⁴-N-carboxamidonorconanine in 10 ml. of glacial acetic acid and 20 ml. of water is treated dropwise at 0° C. with a solution of 2.0 g. of sodium nitrite in 10 ml. of water. The mixture is allowed to stand for 18 hours at 27° C. and the resultant solid precipitate filtered and recrystallized to give 3-keto-$\Delta^4$-N-norconanine.

The 3-keto-$\Delta^4$-N-norconanine (2.5 g.) is dissolved in 100 ml. of chloroform and stirred with two 100 ml. portions of 5% sodium hypochlorite solution, each time for 30 minutes. The chloroform layer is washer, dried and evaporated to give 3-keto-$\Delta^4$-N-chloronorconanine.

A solution of 2.0 g. of 3-keto-$\Delta^4$-N-chloronorconanine and 5.0 g. of potassium hydroxide in 25 ml. of methanol is heated under reflux for one hour under nitrogen, poured into 500 ml. of water and extracted with chloroform. The washed, dried chloroform solution is evaporated to give 3-keto-$\Delta^{4;20,N}$-18,20-iminopregnadiene.

A stirred solution of 1.0 g. of 3-keto-$\Delta^{4;20,N}$-18,20-iminopregnadiene in 2 ml. of glacial acetic acid and 8 ml. of water is treated dropwise at 0° C. with a solution of 0.5 g. of sodium nitrite in 2 ml. of water. Nitrogen evolves and the mixture is allowed to stand for 18 hours at 27° C. The solid precipitate is filtered and recrystallized to yield 3,20-diketo-18-hydroxy-4-pregnene which is in equilibrium with the corresponding 18,20-hemiketal tautomeric form.

*Example 3*

A stirred solution of 5.2 g. of 3,11-diketo-N-cyanonorconanine in 200 ml. of acetic acid is treated with 17 ml. of 1.79 M. hydrogen bromide in acetic acid and then with 4.95 g. of bromine in 25 ml. of acetic acid at 25° C. After 10 minutes the mixture is heated to 40° C. for 10 minutes and the clear solution decanted and poured into 2 l. of water. The product is taken into methylene chloride, washed with water and the solvent then evaporated to give 2,4-dibromo-3,11-diketo-N-cyanonorconanine.

To 21 ml. of acetone is added with stirring 2.22 g. of bromine under cooling and light until the reaction starts. After the solution becomes colorless, 1.71 g. of sodium carbonate is added and the solution stirred for 30 minutes. The neutral reaction mixture is filtered and to the filtrate is added a solution of 20.0 g. of sodium iodide in 80 ml. of acetone. The suspension is stirred and refluxed for 15 minutes, then 3.4 g. of 2,4-dibromo-3,11-diketo-N-cyanonorconanine is added and the whole stirred and refluxed for two and one-half hours. Oxalic acid hydrate (3.68 g.) is added and the whole stirred and refluxed for one hour. Ethyl acetate and water is added, the layers separated and the organic phase is washed successively with water, 5% sodium carbonate solution and water. The organic phase is treated with 10.0 g. of zinc dust and 0.9 ml. of glacial acetic acid, stirred until colorless and then filtered. The solution is washed successively with water, 5% sodium bicarbonate solution, water and then dried and evaporated. The residue dissolved in 40 ml. of ethanol is treated with 1.5 g. of Girard's reagent "T" and 3.0 ml. of acetic acid and boiled for 30 minutes. The solution cooled to 20° C. is treated with 6.0 ml. of 37% formaldehyde solution, allowed to stand for 30 minutes, poured into 400 ml. of 5% sodium bicarbonate solution and extracted with ethyl acetate. The aqueous layer is acidified to pH 1 with concentrated hydrochloric acid, allowed to stand for two hours, extracted with ethyl acetate, washed, dried and evaporated to yield 3,11-diketo-$\Delta^4$-N-cyanonorconanine.

Following the general reaction procedure outlined in Example 2 the N-cyanonorconanine is dissolved in 100 ml. of methanol and refluxed with 5.0 g. of sodium carbonate and 20 ml. of water for six hours to yield 3,11-diketo-$\Delta^4$-N-carboxamidonorconanine. The N-carboxamidonorconanine is dissolved in glacial acetic acid and water and treated dropwise at 0° C. with a solution of 1.5 g. of sodium nitrite in 10 ml. of water. After 18 hours at 27° C. the solid 3,11-diketo-$\Delta^4$-N-norconanine is separated which is then dissolved in chloroform and treated with two 100 ml. portions of 5% sodium hypochlorite solution to give 3,11-diketo-$\Delta^4$-N-chloronorconanine. A solution of the N-chloronorconanine and 7.5 g. of potassium hydroxide in 50 ml. of methanol is refluxed for one hour to give 3,11-diketo-$\Delta^{4;20,N}$-18,20-iminopregnadiene. A stirred solution of 1.0 g. of the iminopregnadiene in 2 ml. of glacial acetic acid and 8 mol. of water is treated dropwise at 0° C. with a solution of 0.5 g. of sodium nitrite in 2 ml. of water. After 18 hours standing at 27° C. the reaction mixture is filtered to yield the solid 18-hydroxy-3,11,20-triketo-4-pregnene which is in equilibrium with its tautomeric forms.

*Example 4*

To 12.0 g. of 3,11-diketo-16$\alpha$-methyl-5$\beta$-N-cyanonorconanine in 300 ml. of methylene chloride is added dropwise with stirring at room temperature a solution of 5.3 g. of bromine in 50 ml. of methylene chloride. When the bromine addition is complete the reaction mixture is washed with dilute sodium bicarbonate solution, water, dried and evaporated to give 4-bromo-3,11-diketo-16$\alpha$-methyl-5$\beta$-N-cyanonorconanine. The bromoconanine is dissolved in 100 ml. of dimethylformamide and 8.3 g. of lithium chloride is added. The mixture is heated under nitrogen on the steam bath for two hours. Water is added and the reaction mixture is extracted with methylene chloride. The extract is washed, dried and evaporated to yield 3,11-diketo-16$\alpha$-methyl-$\Delta^4$-N-cyanonorconanine.

Following the general reaction procedure outlined in Example 2 the 3,11-diketo-16$\alpha$-methyl-$\Delta^4$-N-cyanonorconanine is dissolved in methanol and refluxed with 5.0 g. of sodium carbonate and 15 ml. of water for six hours. The resultant 3,11-diketo-16$\alpha$-methyl-$\Delta^4$-N-carboxamidonorconanine is treated in aqueous acetic acid solution with an aqueous solution of 2.0 g. of sodium nitrite to yield 3,11-diketo-16$\alpha$-methyl-$\Delta^4$-N-norconanine. The N-norconanine is dissolved in chloroform and treated with two 100 ml. portions of 5% sodium hypochlorite solution to give 3,11-diketo-16$\alpha$-methyl-$\Delta^4$-N-chloronorconanine which is dissolved in 25 ml. of methanol and refluxed with 5.0 g. of potassium hydroxide for one hour to give 3,11-diketo-16$\alpha$-methyl-$\Delta^{4;20,N}$-18,20-iminopregnadiene. A stirred solution of 2.0 g. of the iminopregnadiene in 5 ml. of glacial acetic acid and 10 ml. of water is treated dropwise at 0° C. with a solution of 1.0 g. of sodium nitrite in 5 ml. of water. After standing at 27° C. for 18 hours the reaction mixture is filtered to remove the solid 18-hydroxy-16$\alpha$-methyl-3,11,20-triketo-4-pregnene which is in equilibrium with its tautomeric forms.

*Example 5*

A solution of 5.0 g. of 3$\beta$,5$\alpha$-dihydroxy-6$\beta$-methyl-11-ketoconanine (prepared by hydrolysis of the corresponding 5$\alpha$-acetate) in 500 ml. of ether is treated with an anhydrous solution of 4.0 g. of cyanogen bromide in 75 ml. of ether and the mixture maintained at 27° C. for four days. Workup of the reaction mixture yields 3$\beta$,5$\alpha$-dihydroxy-6$\beta$-methyl-11-keto-N-cyanonorconanine. A solution of the diol (4.6 g.) in 250 ml. of toluene and 100 ml. of cyclohexanone is distilled until 100 ml. of distillate has collected. Aluminum isopropoxide (7.0 g.) in 25 ml. of toluene is added and the mixture is refluxed for one and one-half hours. The cooled reaction mixture is washed with dilute sulfuric acid and the solvents steam distilled. Chromatography gives the product 3,11-diketo-6$\beta$-methyl-$\Delta^4$-N-cyanonorconanine. Refluxing the dione in ethanol with a few drops of concentrated hydrochloric acid for 30 minutes gives 3,11-diketo-6$\alpha$-methyl-$\Delta^4$-N-cyanonorconanine.

Following the general reaction procedures outlined in Example 2 the 3,11-diketo-6$\alpha$-methyl-$\Delta^4$-N-cyanonorconanine is dissolved in 200 ml. of methanol and 7.0 g. of sodium carbonate in 25 ml. of water is refluxed for six hours. The resultant 3,11-diketo-6$\alpha$-methyl-$\Delta^4$-N-carboxamidonorconanine is dissolved in 15 ml. of glacial acetic acid and 30 ml. of water and then treated dropwise at 0° C. with a solution of 3.5 g. of sodium nitrite in 20 ml. of water. After standing at 27° C. for 18 hours the reaction mixture is filtered to give 3,11-diketo-6α-methy-Δ⁴-N-norconanine. The N-norconanine is dissolved in chloroform and treated with two 100 ml. portion of 5% sodium hypochlorite solution to give 3,11-diketo-6α-methyl-Δ⁴-N-chloronorconanine which is refluxed for one hour with 7.0 g. of potassium hydroxide in 40 ml. of methanol. The resultant 3,11-diketo-6α-methyl-Δ⁴:²⁰,ᴺ-18,20-iminopregnadiene is dissolved in 6 ml. of glacial acetic acid and 15 ml. of water and is treated dropwise at 0° C. with a solution of 1.5 g. of sodium nitrite in 5 ml. of water. The mixture is allowed to stand at 27° C. for 18 hours and then filtered to yield 18-hydroxy-6α-methyl-3,11,20-triketo-4-pregnene which is in equilibrium with its tautomeric forms.

Similarly, following the reaction procedures as outlined above and in Example 2, 9.0 g. of 3β,5α-diyhdroxy-6β-methylconanine (from the 5α-acetate) or 8.5 g. of 3β,5α-dihydroxy-6β-methyl-19-norconanine are converted to the 3-keto-Δ⁴-N-cyanonorconanines and thence to the corresponding 3,20-diketo-18-hydroxy-6α-methyl-4-pregnene and 3,20-diketo-18-hydroxy-6α-methyl-19-nor-4-pregnene which are in equilibrium with their respective tautomeric forms.

*Example 6*

To 10.0 g. of 3β-hydroxy-9α-fluoro-11-keto-N-cyanonorconanine in 250 ml. of pure acetone is added 2.8 g. of chromic oxide in acetone-sulfuric acid. The solution is quenched with water and filtered to give 3,11-diketo-9α-fluoro-N-cyanonorconanine in acetic acid is treated with 17 ml. of 1.79 M. hydrogen bromide in acetic acid and then with 4.95 g. of bromine in acetic acid. The resulting 2,4 - dibromo - 3,11 - diketo - 9α - fluoro - N - cyanonorconanine is then debrominated as described in Example 3 to yield 3,11-diketo-9α-fluoro-Δ⁴-N-cyanonorconanine.

Following the general reaction procedures of Example 2 the 3,11-diketo-9α-fluoro-Δ⁴-N-cyanonorconanine is dissolved in methanol and refluxed with 6.0 g. of sodium carbonate for six hours. The resultant 3,11-diketo-9α-fluoro-Δ⁴-N-carboxamidonorconanine in 10 ml. of glacial acetic acid and 20 ml. of water is treated dropwise at 0° C. with a solution of 0.5 g. of sodium nitrite in 10 ml. of water. After 18 hours standing at 27° C. the solid 3,11-diketo-9α-fluoro-Δ⁴-N-norconanine is separated, dissolved in chloroform and stirred with two 100 ml. portions of 5% sodium hypochlorite solution. Workup of the chloroform layer yields 3,11-diketo-9α-fluoro-Δ⁴-N-chloronorconanine which is refluxed for one hour in methanol with 5.0 g. of potassium hydroxide to give 3,11-diketo-9α-fluoro-Δ⁴:²⁰,ᴺ-18,20-iminopregnadiene. A stirred solution of 1.0 g. of the iminopregnadiene in 2 ml. of glacial acetic acid and 8 ml. of water is treated dropwise at 0° C. with a solution of 0.5 g. of sodium nitrile in 2 ml. of water. After 18 hours standing at room temperature the mixture is filtered to give the solid 9α-fluoro-18-hydroxy-3,11,20-triketo-4-pregnene which is in equilibrium with its corresponding tautomeric forms.

Similarly, following the general reaction procedures of above and Examples 2 and 3, 9.0 g. of 6α,9α-difluoro-3β-hydroxy-11-keto-N-cyanonorconanine or 10.0 g. of 6α-fluoro-3β-hydroxy-11-keto-N-cyanonorconanine are oxidized, brominated and debrominated to the corresponding 3-keto-Δ⁴-N-cyanonorconanines and then converted to the 6α,9α-difluoro-18-hydroxy-3,11,20-triketo-4-pregnene or 6α-fluoro-18-hydroxy-3,11,20-triketo-4-pregnene products.

*Example 7*

To 10.0 g. of 6α-fluoro-3α-hydroxy-5β-N-cyanonorconanine in 250 ml. of pure acetone is added 2.9 g. of chromic oxide in acetone-sulfuric acid over 10 minutes. The solution is quenched with water and filtered to give 6α-fluoro-3-keto-5β-N-cyanonorconanine. A solution of 6.2 g. of 6α-fluoro-3-keto-5β-N-cyanonorconanine in 150 ml. of methylene chloride is treated with 2.2 g. of bromine in 25 ml. of methylene chloride. The bromine is added dropwise with stirring at room temperature and when complete the reaction is worked up as described in Example 2 to give 4-bromo-6α-fluoro-3-keto-5β-N-cyanonorconanine. The bromo conanine is then dissolved in 50 ml. of dimethylformamide and debrominated with 3.5 g. of lithium chloride by heating on the steam bath for two hours to yield upon workup 6α-fluoro-3-keto-Δ⁴-N-cyanonorconanine.

Following the reaction procedures of Examples 6 and 2, the 6α-fluoro-3-keto-Δ⁴-N-cyanonorconanine (5.5 g.) is converted to the 3,20-diketo-6α-fluoro-18-hydroxy-4-pregnene which is in equilibrium with the corresponding 18,20-hemiketal form.

*Example 8*

A stirred solution of 10.4 g. of 3-keto-19-nor-N-cyanonorconanine in 150 ml. of acetic acid is treated with 50 ml. of 1.79 M. hydrogen bromide in acetic acid and then with 7.5 g. of bromine in 35 ml. of acetic acid to yield 2,4-dibromo-3-keto-19-nor-N-cyanonorconanine. Following the procedure of Example 3, the dibromide is debrominated to give 3-keto-19-nor-Δ⁴-N-cyanonorconanine.

Following the general reaction procedures of Example 2, the 3-keto-19-nor-Δ⁴-N-cyanonorconanine is dissolved in 200 ml. of methanol and refluxed with 8.0 g. of sodium carbonate for six hours. The resultant 3-keto-19-nor-Δ⁴-N-carboxamidonorconanine is dissolved in 15 ml. of glacial acetic acid and 25 ml. of water and treated dropwise at 0° C. with a solution of 3.0 g. of sodium nitrite in 15 ml. of water. After 18 hours standing at room temperature the reaction mixture is filtered to give the solid 3-keto-19-nor-Δ⁴-N-norconanine. The N-nor-conanine in 250 ml. of chloroform is stirred with two 100 ml. portions of 5% sodium hypochlorite solution. Evaporation of the chloroform layer gives 3-keto-19-nor-Δ⁴-N-chloronorconanine which is further refluxed with 10.0 g. of potassium hydroxide in 50 ml. of methanol for one hour. Working up the reaction mixture, 3-keto-19-nor-Δ⁴:²⁰,ᴺ-18,20-iminopregnadiene is obtained. A stirred solution of 2.5 g. of the iminopregnadiene in 5 ml. of glacial acetic acid and 12 ml. of water is treated dropwise at 0° C. with a solution of 1.5 g. of sodium nitrite in 5 ml. of water. After standing at 27° C. for 18 hours, the reaction mixture is filtered to give the solid 3,20-diketo-18-hydroxy-19-nor-4-pregnene which is in equilibrium with its tautomeric form.

*Example 9*

A solution of 10.0 g. of 3β,11β-dihydroxy-19-nor-N-cyanonorconanine in 250 ml. of pure acetone is oxidized with 3.0 g. of chromic oxide in acetone-sulfuric acid. The reaction mixture is quenched with water and filtered to give 3,11-diketo-19-nor-N-cyanonorconanine. This compound (7.5 g.) is treated with 26 ml. of 1.79 M. hydrogen bromide in acetic acid and with 7.5 g. of bromine according to the procedure described in Example 3 to give 2,4-dibromo-3,11-diketo-19-nor-N-cyanonorconanine which is similarly debrominated to give 3,11-diketo-19-nor-Δ⁴-N-cyanonorconanine.

Following the general reaction procedures of Examples 2 and 3, 6.0 g. of 3,11-diketo-19-nor-Δ⁴-N-cyanonorconanine is converted to the corresponding 18-hydroxy-3,11,20-triketo-19-nor-4-pregnene which is in equilibrium with its tautomeric forms.

*Example 10*

A solution of 8.6 g. of 3β,5α-dihydroxy-6β-fluoro-19-nor-N-cyanonorconanine in 500 ml. of toluene and 200 ml. of cyclohexanone is distilled until 200 ml. of distillate has collected. Aluminum isopropoxide (15.0 g.) in 50 ml. of toluene is added and the mixture is refluxed for one and one-half hours. The cooled reaction mixture is washed with dilute sulfuric acid and the solvents steam distilled. Chromatography gives the product 3-keto-6β-fluoro-19-nor-Δ⁴-N-cyanonorconanine. Refluxing this compound in ethanol with a few drops of concentrated hydrochloric acid for 30 minutes gives 3-keto-6α-fluoro-19-nor-Δ⁴-N-cyanonorconanine.

Following the general reaction procedures of Example 2, the 3-keto-6α-fluoro-19-nor-Δ⁴-N-cyanonorconanine is dissolved in 150 ml. of methanol and refluxed for six hours with 4.0 g. of sodium carbonate. The resultant 3-keto-6α-fluoro-19-nor-Δ⁴-N-carboxamidonorconanine is dissolved in 5 ml. of glacial acetic acid and 10 ml. of water and is treated dropwise at 0° C. with a solution of 1.0 g. of sodium nitrite in 5 ml. of water. After standing at room temperature for 18 hours the solid 3-keto-6α-fluoro-19-nor-Δ⁴-N-norconanine is filtered off, dissolved in chloroform and stirred with two 100 ml. portions of 5% sodium hypochlorite solution to give 3-keto-6α-fluoro-19-nor-Δ⁴-N-chloronorconanine. The N-chloronorconanine is dissolved in 30 ml. of methanol and refluxed for one hour with 5.0 g. of potassium hydroxide to give 3-keto-6α-fluoro-19-nor-$\Delta^{4;20,N}$- 18,20-iminopregnadiene. The iminopregnadiene is dissolved in 5 ml. of glacial acetic acid and 10 ml. of water and treated dropwise at 0° C. with a solution of 1.0 g. of sodium nitrite in 5 ml. of water. After standing at room temperature for 18 hours, the reaction mixture is filtered to yield 3,20-diketo-6α-fluoro-18-hydroxy-19-nor-4-pregnene which is in equilibrium with its corresponding tautomeric form.

*Example 11*

A mixture of 2.0 g. of 2,4-dibromo-3,11-diketo-N-cyanonorconanine (prepared as in Example 3) in 30 ml. of collidine is heated at reflux for 30 minutes. The cooled reaction mixture is treated with water and extracted with chloroform. The chloroform extract is washed with water and evaporated under reduced pressure to give 3,11-diketo-$\Delta^{1,4}$-N-cyanonorconanine.

Following the general reaction procedure of Example 2 the 3,11-diketo-$\Delta^{1,4}$-N-cyanonorconanine is dissolved in 100 ml. of methanol and refluxed with 5.0 g. of sodium carbonate and 20 ml. of water for six hours to give 3,11-diketo-$\Delta^{1,4}$-N-carboxamidonorconanine. The N-carboxamidonorconanine is dissolved in aqueous acetic acid and treated dropwise at 0° C. with an aqueous solution of 1.5 g. of sodium nitrite. After 18 hours at 27° C. the solid 3,11-diketo-$\Delta^{1,4}$-N-norconanine is filtered off, dissolved in chloroform and treated with two 100 ml. portions of 5% sodium hypochlorite solution to give 3,11-diketo-$\Delta^{1,4}$-N-norconanine. A solution of the N-chloronorconanine and 7.5 g. of potassium hydroxide in 50 ml. of methanol is heated at reflux for one hour to give 3,11-diketo-$\Delta^{1;4;20,N}$-18,20-iminopregnatriene. A stirred solution of 1.0 g. of the iminopregnatriene in 10 ml. of aqueous acetic acid is treated dropwise at 0° C. with an aqueous solution of 0.5 g. of sodium nitrite. After 18 hours standing at 27° C. the reaction mixture is filtered to yield the solid 18-hydroxy-3,11,20-triketo-1,4-pregnadiene which is in equilibrium with its tautomeric forms.

*Example 12*

A solution of 3.4 g. of 3,20-diketo-18-hydroxy-6α-methyl-4-pregnene (prepared as in Example 5) in 150 ml. of tert.-butanol containing 1.5 ml. of glacial acetic acid is refluxed with 1.1 g. of selenium dioxide for 24 hours under nitrogen. The suspension is filtered, the filtrate evaporated and the residue dissolved in ethyl acetate. The solution is washed successively with 5% potassium bicarbonate solution, water, ammonium sulfide solution, cold 5% ammonium hydroxide solution, water, 1% hydrochloric acid and water. The washed extract is then evaporated to give 3,20-diketo-18-hydroxy-6α-methyl-1,4-pregnadiene which is in equilibrium with its corresponding 18,20-hemiketal form.

*Example 13*

A solution of 4.0 g. of 9α-fluoro-18-hydroxy-3,11,20-triketo-4-pregnene (prepared as in Example 6) in 150 ml. of tert.-butanol containing 1.5 ml. of glacial acetic acid is refluxed with 1.1 g. of selenium dioxide for 24 hours under nitrogen to give upon workup of the reaction mixture as described in Example 12 the corresponding 9α-fluoro-18-hydroxy-3,11,20-triketo-1,4-pregnadiene which is in equilibrium with its tautomeric forms.

What is claimed is:

1. The method of forming 3-keto-$\Delta^{4;20,N}$-18,20-iminopregnadienes having the following formula:

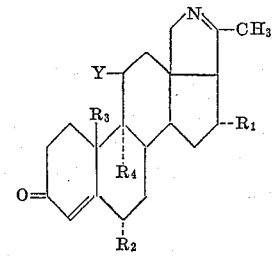

in which Y is a member selected from the group consisting of hydrogen and keto; $R_1$ and $R_3$ are members selected from the group consisting of hydrogen and methyl; $R_2$ is a member selected from the group consisting of hydrogen, methyl and fluoro; and $R_4$ is a member selected from the group consisting of hydrogen and fluoro, which comprises hydrolyzing with a member selected from the group consisting of an alkali metal hydroxide, an alkali metal carbonate and a mineral acid a 3-keto-$\Delta^4$-N-cyanonorconanine having the following formula:

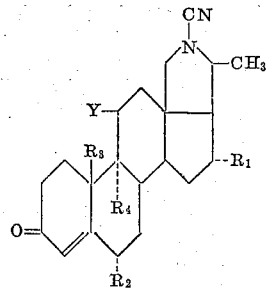

in which Y, $R_1$, $R_2$, $R_3$ and $R_4$ are as defined above, to form a 3-keto-$\Delta^4$-N-carboxamidonorconanine having the following formula:

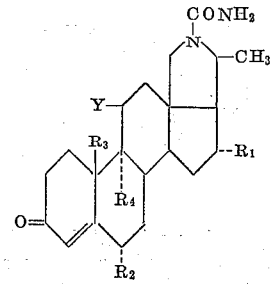

in which Y, $R_1$, $R_2$, $R_3$ and $R_4$ are as defined above; reacting said N-carboxamidonorconanine with nitrous acid to form a 3-keto-Δ⁴-N-norconanine having the following formula:

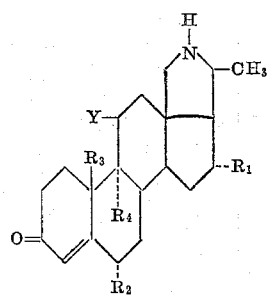

in which Y, R₁, R₂, R₃ and R₄ are as defined above; reacting said N-norconanine with a halogenating agent selected from the group consisting of N-chlorosuccinimide, hypochlorous acid, sodium hypobromite and sodium hypochlorite to form a 3-keto-Δ⁴-N-halonorconanine having the following formula:

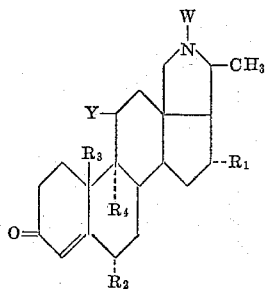

in which W is halogen of atomic weight less than 80; and Y, R₁, R₂, R₃ and R₄ are as defined above; and dehydrohalogenating said N-halonorconanine with a member selected from the group consisting of an alkali metal hydroxide and an alkali metal lower alkoxide.

2. In the method of forming 3-keto-Δ⁴·²⁰,ᴺ-18-20-iminopregnadienes of claim 1, the steps which comprise hydrolyzing with a member selected from the group consisting of an alkali metal hydroxide, an alkali metal carbonate and a mineral acid a 3-keto-Δ⁴-N-cyanonorconanine having the following formula:

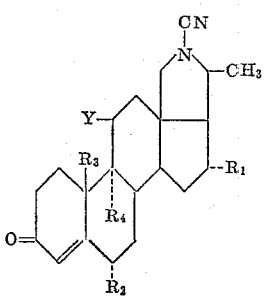

in which Y is a member selected from the group consisting of hydrogen and keto; R₁ and R₃ are members selected from the group consisting of hydrogen and methyl; R₂ is a member selected from the group consisting of hydrogen, methyl and fluoro; and R₄ is a member selected from the group consisting of hydrogen and fluoro, to form a 3-keto-Δ⁴-N-carboxamidonorconanine having the following formula:

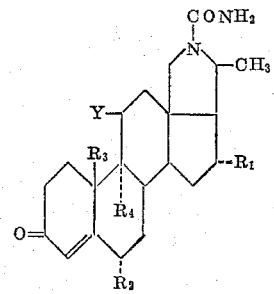

in which Y, R₁, R₂, R₃ and R₄ are as defined above; and reacting said N-carboxamidonorconanine with nitrous acid to form a 3-keto-Δ⁴-N-norconanine having the following formula:

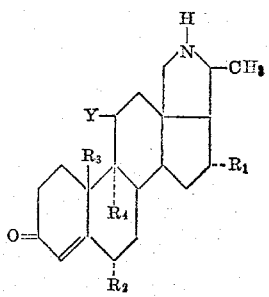

in which Y, R₁, R₂, R₃ and R₄ are as defined above.

3. A compound having the formula:

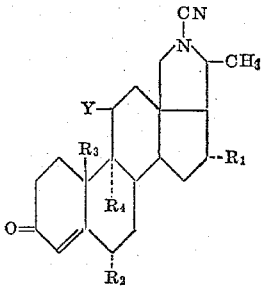

in which Y is a member selected from the group consisting of hydrogen and keto; R₁ and R₃ are members selected from the group consisting of hydrogen and methyl; R₂ is a member selected from the group consisting of hydrogen, methyl and fluoro; and R₄ is a member selected from the group consisting of hydrogen and fluoro.

4. A compound having the formula:

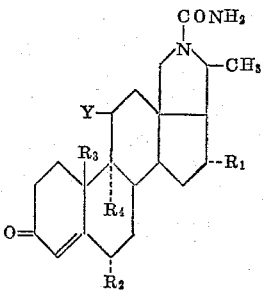

in which Y is a member selected from the group consisting of hydrogen and keto; R₁ and R₃ are members selected from the group consisting of hydrogen and methyl; R₂ is a member selected from the group consisting of hydrogen, methyl and fluoro; and R₄ is a member selected from the group consisting of hydrogen and fluoro.

5. A compound having the formula:

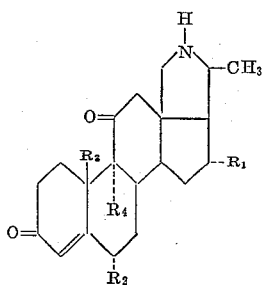

in which $R_1$ and $R_3$ are members selected from the group consisting of hydrogen and methyl; $R_2$ is a member selected from the group consisting of hydrogen, methyl and fluoro; and $R_4$ is a member selected from the group consisting of hydrogen and fluoro.

6. A compound having the formula:

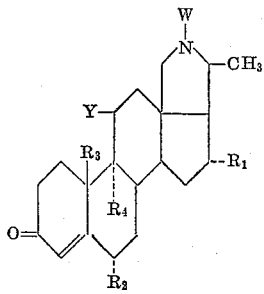

in which W is halogen of atomic weight less than 80; Y is a member selected from the group consisting of hydrogen and keto; $R_1$ and $R_3$ are members selected from the group consisting of hydrogen and methyl; $R_2$ is a member selected from the group consisting of hydrogen, methyl and fluoro; and $R_4$ is a member selected from the group consisting of hydrogen and fluoro.

7. A compound having the formula:

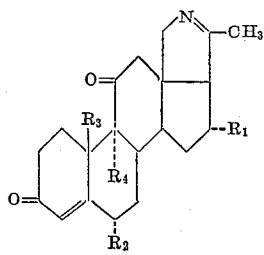

in which $R_1$ and $R_3$ are members selected from the group consisting of hydrogen and methyl; $R_2$ is a member selected from the group consisting of hydrogen, methyl and fluoro; and $R_4$ is a member selected from the group consisting of hydrogen and fluoro.

8. A compound having the formula:

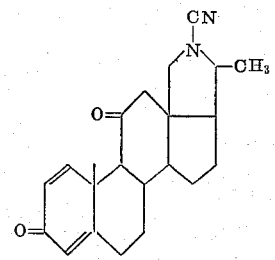

9. A compound having the formula:

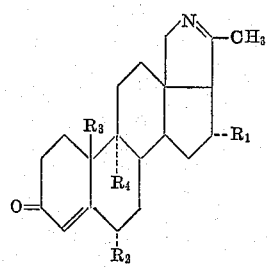

in which $R_1$ and $R_3$ are members selected from the group consisting of hydrogen and methyl; $R_2$ is a member selected from the group consisting of hydrogen, methyl and fluoro; $R_4$ is a member selected from the group consisting of hydrogen and fluoro; and with one of the substituents $R_2$ and $R_4$ being fluoro.

10. A compound having the formula:

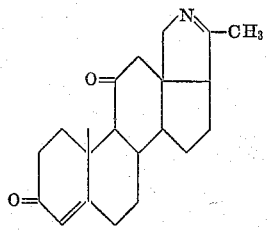

11. A compound having the formula:

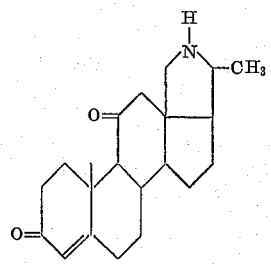

References Cited in the file of this patent
UNITED STATES PATENTS

| | | |
|---|---|---|
| 2,837,464 | Nobile | June 3, 1958 |
| 2,891,948 | Pappo | June 23, 1959 |
| 2,913,455 | Pappo | Nov. 17, 1959 |
| 2,959,586 | Kerwin et al. | Nov. 8, 1960 |

OTHER REFERENCES

Buzzetti et al.: Helv. Chim. Acta, vol. 42, pp. 388–91 (Feb. 2, 1959).